United States Patent
Ohmiya

(10) Patent No.: US 8,279,459 B2
(45) Date of Patent: Oct. 2, 2012

(54) IMAGE FORMING APPARATUS, IMAGE FORMING METHOD, AND COMPUTER PROGRAM PRODUCT WHICH COUNTS THE NUMBER OF TIMES OF FORMING THE LATENT IMAGE IN A SUB-SCANNING DIRECTION

(75) Inventor: Satoshi Ohmiya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1156 days.

(21) Appl. No.: 12/132,171

(22) Filed: Jun. 3, 2008

(65) Prior Publication Data
US 2008/0304118 A1 Dec. 11, 2008

(30) Foreign Application Priority Data

Jun. 5, 2007 (JP) ................. 2007-149628
May 15, 2008 (JP) ................. 2008-128614

(51) Int. Cl.
*G06F 15/00* (2006.01)

(52) U.S. Cl. .................. 358/1.12; 358/1.2; 358/488

(58) Field of Classification Search .................. 358/1.1, 358/1.2, 1.9, 1.12, 400, 401, 474, 488; 382/298, 382/299
See application file for complete search history.

(56) References Cited

U.S. PATENT DOCUMENTS

| 6,469,800 | B1 * | 10/2002 | Lu et al. .................. 358/1.2 |
| 2006/0023231 | A1 | 2/2006 | Ohmiya |
| 2007/0133016 | A1 | 6/2007 | Ohmiya |

FOREIGN PATENT DOCUMENTS

JP     2005-138429     6/2005

* cited by examiner

*Primary Examiner* — Thomas D Lee
(74) *Attorney, Agent, or Firm* — Oblon, Spivak, McClelland, Maier & Neustadt, L.L.P.

(57) ABSTRACT

A forming unit forms a latent image of input image data. A counter counts number of times of forming the latent image in a sub-scanning direction, in which an upper limit of the number of times is set. A first control unit controls the forming unit to form the latent image based on the upper limit. A determining unit determines whether a latent image forming is performed by the forming unit exceeding the upper limit. When the determining unit determines that the latent image forming is performed exceeding the upper limit, a second control unit controls, the forming unit to continue to form the latent image.

17 Claims, 13 Drawing Sheets

IMAGE FORMING APPARATUS, IMAGE FORMING METHOD, AND COMPUTER PROGRAM PRODUCT WHICH COUNTS THE NUMBER OF TIMES OF FORMING THE LATENT IMAGE IN A SUB-SCANNING DIRECTION

CROSS-REFERENCE TO RELATED APPLICATIONS

The present application claims priority to and incorporates by reference the entire contents of Japanese priority document 2007-149628 filed in Japan on Jun. 5, 2007, and 2008-128614 filed in Japan on May 15, 2008

BACKGROUND OF THE INVENTION

1. Field of the Invention

The present invention relates to an image forming apparatus, an image forming method, and a computer program product.

2. Description of the Related Art

Generally, image forming apparatuses should preferably perform image forming on recording media in various sizes including a standard sizes and a nonstandard size. For forming an image on a sheet in a nonstandard size, the sheet is fed from a manual feeding tray instead of a normal feeding unit in an image forming apparatus. A size of a recording medium available for the manual feeding tray is determined such that a length in a main-scanning direction is up to a length of the manual feeding tray and a length in a sub-scanning direction is up to a length determined from a specification of the image forming apparatus. For example, in an A3 printing machine, a maximum length in the sub-scanning direction using the normal feed tray is 432 millimeters while a maximum length in the sub-scanning direction using the manual feeding tray is 1260 millimeters. Furthermore, in an A0 printing machine, a maximum length in the sub-scanning direction using the normal feed tray is 1189 millimeters while a maximum length in the sub-scanning direction using the manual feeding tray is 15000 millimeters on assumption of using a roll paper. Thus, in the image forming apparatuses, a maximum printable area in the sub-scanning direction covers long sizes including nonstandard sizes.

A conventional technology for forming an image with respect to an image area is disclosed in, for example, Japanese Patent Application Laid-Open No. 2005-138429. Specifically, a conventional video-signal processing circuit for writing an image to an image carrier in the main-scanning direction and in the sub-scanning direction based on image data is disclosed in the above document. The video-signal processing circuit is used for generating a sub-scanning image valid area signal for controlling an image area in the sub-scanning direction. The video-signal processing circuit includes a state machine and a sub-scanning counter and generates the sub-scanning image valid area signal based on thresholds of the sub-scanning counter and an image area.

In the conventional technology, the sub-scanning valid-area signal is generated in the video-signal processing circuit as a main section of a write control unit based on thresholds of the sub-scanning counter and a length of an image area. Therefore, the sub-scanning counter needs to have counter bits corresponding to a maximum length of an image available in the sub-scanning direction. That is, when an image with a maximum length in the sub-scanning direction is formed, the counter bits needs to be adjusted for the maximum length in the sub-scanning direction. For example, when an image forming apparatus with resolution of 1200 dpi in the sub-scanning direction is used, because the standard size of 432 millimeters in an A3 printing machine corresponds to 20409 (0x4FB9) lines, a sub-scanning counter with 15-bit width is necessary. Furthermore, the maximum length in the sub-scanning direction of 1260 millimeters corresponds to 59527 (0xE887) lines, so that the sub-scanning counter with 16-bit width is necessary. In this state, in an A0 printing machine with resolution of 1200 dpi in the sub-scanning direction, its standard size of 1189 millimeters in the sub-scanning direction corresponds to 56173 (0xDB6D) lines and within the 16-bit width. However, the maximum length of 15000 millimeters in the sub-scanning direction corresponds to 708661 (0xAD035) lines and therefore the sub-scanning counter with 20-bit width is necessary. The values in the parentheses are represented by hexadecimal.

As described above, a necessary bit width of the sub-scanning counter increases as a size of a transfer sheet increases. As the bit-width of the sub-scanning counter increases, it is necessary to increase a bit-width of a register in which thresholds of an area to be compared with a counter value. Specifically, an area register necessary for controlling a sub-scanning image area contains the number of sub-scanning write lines, the number of sub-scanning image-data transfer valid lines, a sub-scanning trim leading edge position, a sub-scanning trim trailing edge position, and the like. A bit width of such a register also needs to be extended to handle a long size, similar to the sub-scanning counter. For example, the bit width needs to be extended such that 15-bit width to 16-bit width for an A3 printing machine and 16-bit width to 20-bit width for an A0 printing machine.

In some image forming apparatuses, a plurality of the sub-scanning counters are implemented. Specifically, for a tandem-type color image forming apparatus having a plurality of photosensitive drums, because a timing of image forming is different for each color, it is necessary to have circuit configuration capable of performing exclusive control. Therefore, the sub-scanning counters corresponding to the number of colors used in the image forming apparatus needs to be installed. For example, a color image forming apparatus using a laser diode forms a full-color image using four colors of black (K), magenta (M), yellow (Y), and cyan (C), so that four sub-scanning counters are necessary for each color.

Furthermore, some other image forming apparatuses include a plurality of area registers. Specifically, area registers are implemented in an image forming apparatus so that they are selectively used depending on situations and modes of image forming using interleaved processing. For example, when a plurality of sizes (e.g., A3 size and A4 size) are mixed in recording media, or when resolutions and modes are different between both sides in one recording medium, an appropriate area register is selected.

As described above, in the conventional technology, for generating the sub-scanning valid-area signal is generated based on thresholds of the sub-scanning counter and the area register, the sub-scanning counter and the area register need to have bit widths corresponding to maximum lengths in the sub-scanning direction depending on specifications of image forming apparatuses. Therefore, a size of circuit configurations disadvantageously increases. Furthermore, circuit configurations and control software become complicated and different memory configurations are necessary for different sizes of recording media.

SUMMARY OF THE INVENTION

It is an object of the present invention to at least partially solve the problems in the conventional technology.

According to an aspect of the present invention, there is provided an image forming apparatus including a forming unit that forms a latent image of input image data; a counter that counts number of times of forming the latent image in a sub-scanning direction, in which an upper limit of the number of times is set; a first control unit that controls the forming unit to form the latent image based on the upper limit; a determining unit that determines whether a latent image forming is performed by the forming unit exceeding the upper limit; and a second control unit that controls, when the determining unit determines that the latent image forming is performed exceeding the upper limit, the forming unit to continue to form the latent image.

Furthermore, according to another aspect of the present invention, there is provided an image forming method for an image forming apparatus including a counter that counts number of times of forming a latent image of input image data in a sub-scanning direction in which an upper limit of the number of times is set. The image forming method includes forming a latent image of input image data; first controlling including controlling the forming to form the latent image based on the upper limit; determining whether a latent image forming is performed exceeding the upper limit; and second controlling including controlling, when it is determined that the latent image forming is performed exceeding the upper limit, the forming to continue to form the latent image.

Moreover, according to still another aspect of the present invention, there is provided a computer program product including a computer usable medium having computer readable program codes embodied in the medium for forming an image in an image forming apparatus including a counter that counts number of times of forming a latent image of input image data in a sub-scanning direction in which an upper limit of the number of times is set. The computer readable program codes when executed cause a computer to execute forming a latent image of input image data; first controlling including controlling the forming to form the latent image based on the upper limit; determining whether a latent image forming is performed exceeding the upper limit; and second controlling including controlling, when it is determined that the latent image forming is performed exceeding the upper limit, the forming to continue to form the latent image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
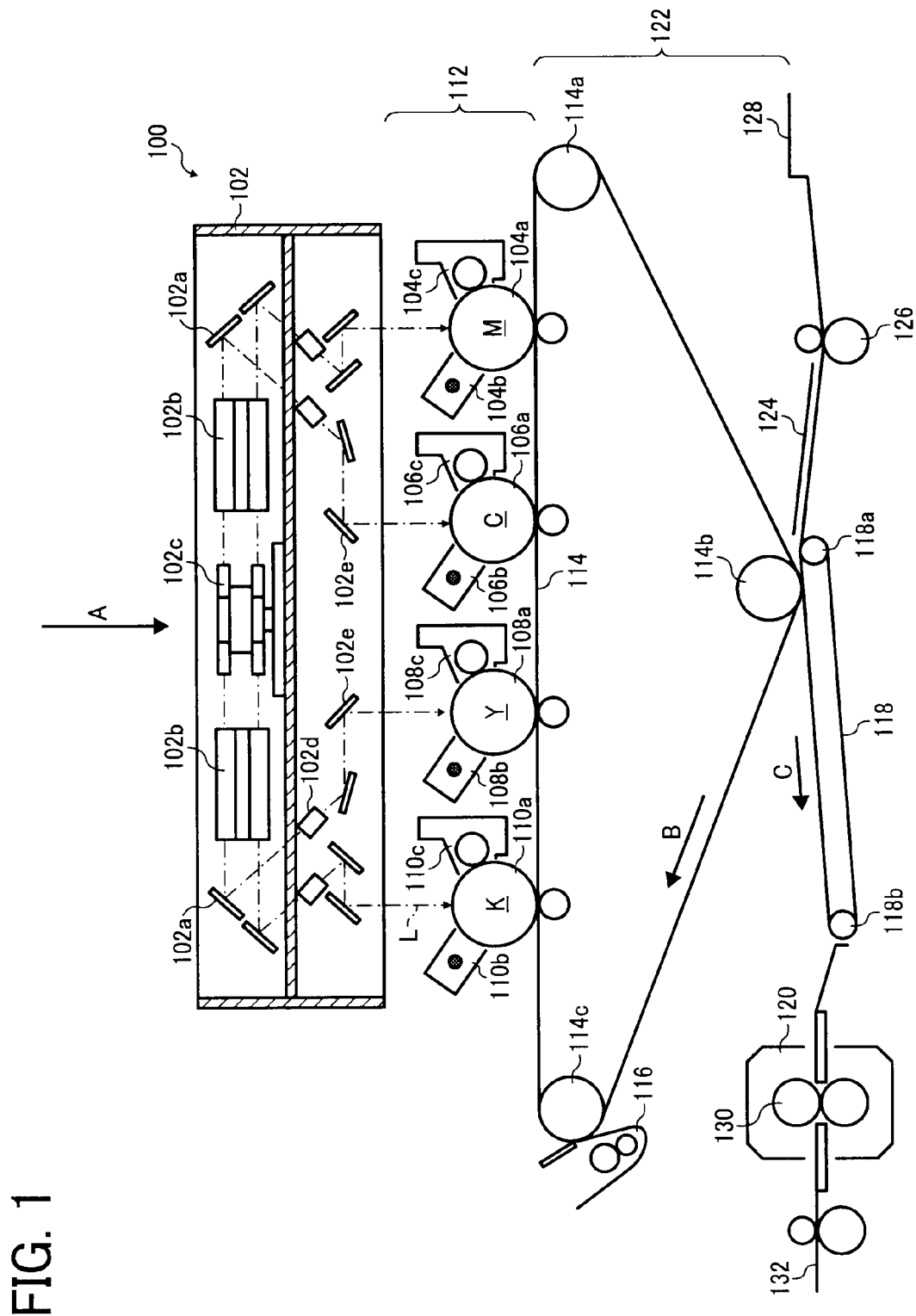
FIG. 1 is a schematic diagram of an image forming apparatus according to a first embodiment of the present invention.

FIG. 1 is a schematic diagram of an image forming apparatus 100 according to a first embodiment of the present invention. The image forming apparatus 100 includes an optical unit 102 including a semiconductor laser, a polygon mirror, and the like, an image forming unit 112 including a charging unit, a developing unit, and the like, and a transfer unit 122 including an intermediate transfer belt, and the like. Specifically, in the optical unit 102, an optical beam A emitted from a light source such as a semiconductor laser (not shown) is deflected by a polygon mirror 102c and enters into an fθ lens 102b. The optical beam A is emitted for each of colors of cyan (C), magenta (M), yellow (Y), and black (K) in the image forming apparatus 100. After passing through the fθ lens 102b, the optical beam A is reflected by a reflection mirror 102a toward a wide troidal (WTL) lens 102d.

The WTL lens 102d shapes the optical beam and deflects the optical beam toward a reflection mirror 102e. The reflection mirror 102e reflects the optical beam as an optical beam L to irradiate each of photosensitive drums 104a, 106a, 108a, and 110a for exposing an image. Because a plurality of the optical components are used for irradiating the photosensitive drums 104a, 106a, 108a, and 110a with the optical beam L, a timing in a main-scanning direction and a timing in a sub-scanning direction are controlled to be synchronized with each other. In this document, the main-scanning direction corresponds to a scanning direction of an optical beam, and the sub-scanning direction corresponds to a direction perpendicular to the main-scanning direction. That is, the sub-scanning direction corresponds to a rotational direction of the photosensitive drums 104a, 106a, 108a, and 110a.

Each of the photosensitive drums 104a, 106a, 108a, and 110a is structured such that a photoconductive layer containing at least a charge generation layer and a charge transport layer is arranged over a conductive drum made of aluminum and the like. The photoconductive layer is provided for each of the photosensitive drums 104a, 106a, 108a, and 110a, and surface charge (electrostatic charge) is applied to the photoconductive layer by each of charging units 104b, 106b, 108b, and 110b. Each of the charging units 104b, 106b, 108b, and 110b includes a corotron, a scorotron, a charging roller, and the like.

The photosensitive drums 104a, 106a, 108a, and 110a with applied electrostatic charge are exposed with the optical beam L by the charging units 104b, 106b, 108b, and 110b, respectively. Accordingly, an electrostatic latent image is formed.

The electrostatic latent images formed on the photosensitive drums 104a, 106a, 108a, and 110a are developed by developing units 104c, 106c, 108c, and 110c, respectively. Accordingly, a developed image is formed. Each of the developing units 104c, 106c, 108c, and 110c includes a developing sleeve, a developer supplying roller, a regulating roller, and the like.

The developed image on each of the photosensitive drums 104a, 106a, 108a, and 110a is sequentially transferred on an intermediate transfer belt 114 conveyed by conveyor rollers 114a, 114b, and 114c in a direction indicated by an arrow B in FIG. 1. The transfer belt 114 with the developed images in cyan (C), magenta (M), yellow (Y), and black (K) is conveyed toward a secondary transfer unit. The secondary transfer unit includes a secondary transfer belt 118 and conveyor rollers 118a and 118b. The secondary transfer belt 118 is moved by the conveyor rollers 118a and 118b in a direction indicated by an arrow C in FIG. 1. A recording medium 124, such as a woodfree paper and a plastic sheet, is fed from a container 128, such as a sheet cassette, to the secondary transfer unit by a feed roller 126.

The secondary transfer unit applies secondary transfer bias so that a full-color developed image on the intermediate transfer belt 114 is transferred to the recording medium 124 set on the secondary transfer belt 118. The recording medium 124 is conveyed to a fixing unit 120 along with movement of the secondary transfer belt 118. The fixing unit 120 includes a fixing member 130 such as a fixing roller having a portion made of silicon rubber, fluororubber, and the like. The fixing unit 120 fixes the full-color developed image onto the recording medium 124 by applying pressure and heat, and discharges a printed object 132 out of the image forming apparatus 100. After the full-color developed image is transferred from the transfer belt 114, a cleaning unit 116 having a cleaning blade removes residual developer from the transfer belt 114. The transfer belt 114 is then subjected to a next image forming process.

Figure 2:
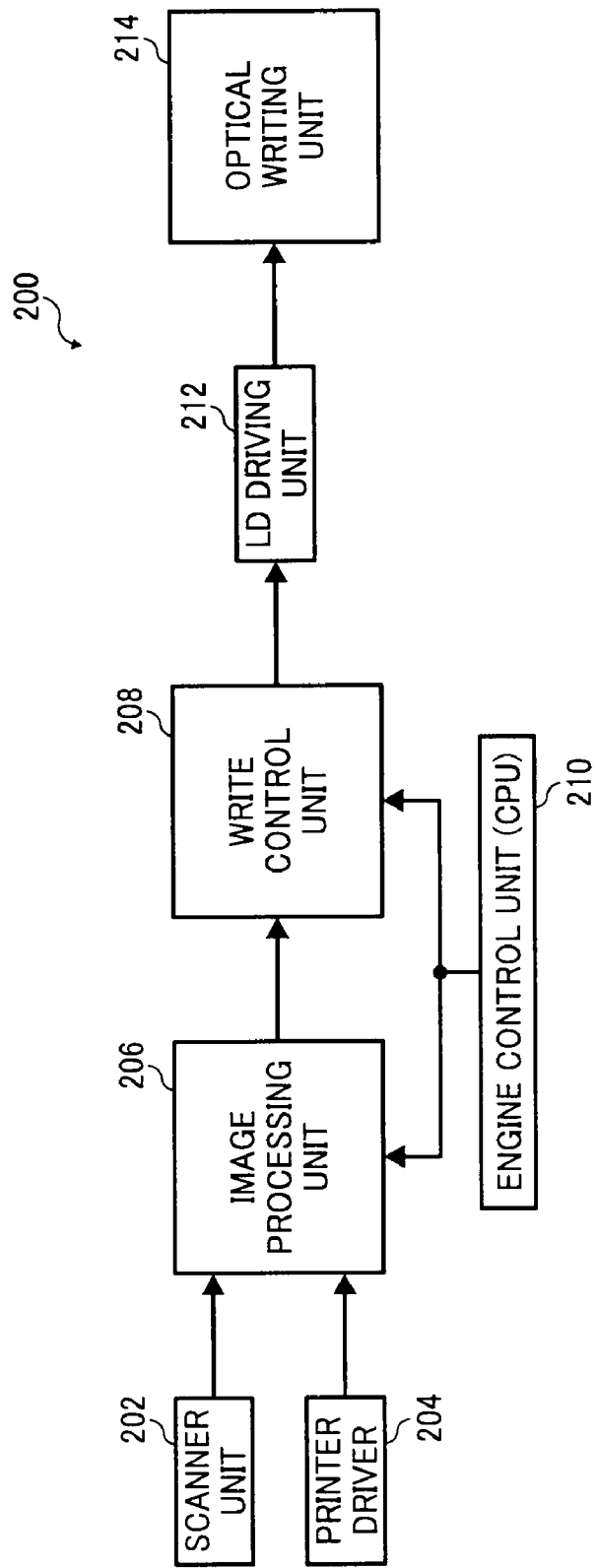
FIG. 2 is a block diagram of a control block that controls data flow of image data in the image forming apparatus shown in FIG. 1.

FIG. 2 is a block diagram of a control block 200 of the image forming apparatus 100. An engine control unit 210 including a CPU sets a control parameter for each of control units in the image forming apparatus 100. When a start switch of the image forming apparatus 100 is turned ON or a printing job start signal from a printing host is activated, a scanner unit 202 and a printer driver 204 output an image data signal to an image processing unit 206. The image processing unit 206 performs image processing such as segmentation, image rotation, and compilation, and outputs a processed image to a write control unit 208.

The write control unit 208 performs timing processing for expanding input image data to a two-dimensional image. Then, the write control unit 208 performs a format conversion of image data of the two-dimensional image in accordance with a driver setting of a laser diode (LD) driving unit 212. The LD driving unit 212 includes a driver IC for driving an LD. Specifically, the LD driving unit 212 drives the LD connected to an optical writing unit 214 based on the input image data, so that the photosensitive drums 104a, 106a, 108a, and 110a are irradiated with a laser beam, and thereby an electrostatic latent image is formed.

Figure 3:
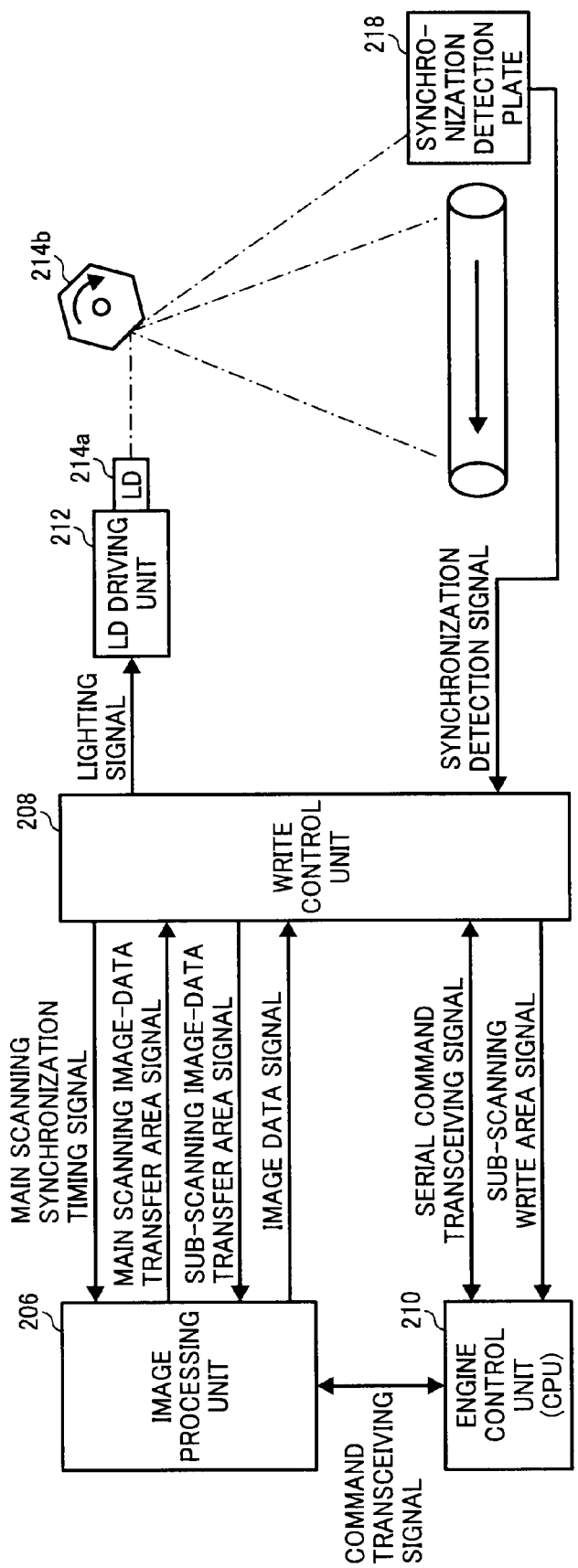
FIG. 3 is a schematic diagram of a peripheral block that controls a write control unit shown in FIG. 2.

FIG. 3 is a schematic diagram of a peripheral block that controls the write control unit 208. The image forming apparatus 100 is controlled by the engine control unit 210 to perform a predetermined operation. The engine control unit 210 sends a command transceiving signal to the image processing unit 206 and the write control unit 208. The command communication is performed using serial transfer and a control state is managed such that the engine control unit 210 receives and checks statuses of the various control units. After control parameters are set, the write control unit 208 outputs to the LD driving unit 212 a lighting signal for lighting the LD at a predetermined timing and a rotation signal to a motor 214b as a deflector so that the laser beam output from an LD 214a as a light source is deflected by the motor 214b. At the time of start of scanning in the main-scanning direction, the laser beam enters into an optical sensor mounted on a synchronization detection plate 218. The synchronization detection plate 218 detects the laser beam and generates a synchronization detection signal. The synchronization detection signal generated by the synchronization detection plate 218 is output to the write control unit 208 and used for controlling scanning in the sub-scanning direction.

The write control unit 208 performs a timing control using the synchronization detection signal as a reference signal in the main-scanning direction. When transferring image data from the image processing unit 206 to the write control unit 208, image data signal is output from a scanner unit (not shown) and a printer driver (not shown) to the image processing unit 206. Therefore, it is necessary to transfer data processed by the image processing unit 206 to the LD driving unit 212. As for a transfer timing, a registration needs to be performed at a timing at which the recording medium is eventually output. The engine control unit 210 sends a job start command to the write control unit 208 at a timing synchronized with a sheet conveyance control.

Upon receiving the job start command, the write control unit 208 outputs to the image processing unit 206 a sub-scanning image-data transfer area signal for requesting transfer of image data. The image processing unit 206 receives the sub-scanning image-data transfer area signal and outputs an image data signal to the write control unit 208. In this state, the timing in the main-scanning direction and the timing in the sub-scanning direction need to be synchronized with each other in the write control unit 208 and the image processing unit 206. For synchronizing the timings in the main-scanning direction, a main-scanning synchronization timing signal and a main-scanning image-data transfer area signal are used. The main-scanning synchronization timing signal is generated using the synchronization detection signal from the synchronization detection plate 218 as a reference signal, and transferred from the write control unit 208 to the image processing unit 206.

The image processing unit 206 receives the main-scanning synchronization timing signal, generates a main-scanning image-data transfer area signal indicative of a valid area of image data to be transferred, and outputs the main-scanning image-data transfer area signal with the image data to the write control unit 208. The timing synchronization between the write control unit 208 and the image processing unit 206 is performed such that image data to be written to one side of the motor 214b is transferred with respect to one pulse of the main-scanning synchronization timing signal and thus image data and control signals are transferred. The engine control unit 210 needs to recognize a timing at which image forming is being performed after the job start signal is output for determining a timing of setting various control parameters for a next image forming. By sending a sub-scanning write area signal from the write control unit 208 to the engine control unit 210 at the same timing as that at which the LD driving unit 212 as the final control block drives the laser diode, the engine control unit 210 recognizes the timing. Thus, the engine control unit 210 checks the timing of image forming by the write control unit 208 based on the sub-scanning write area signal.

Figure 4:
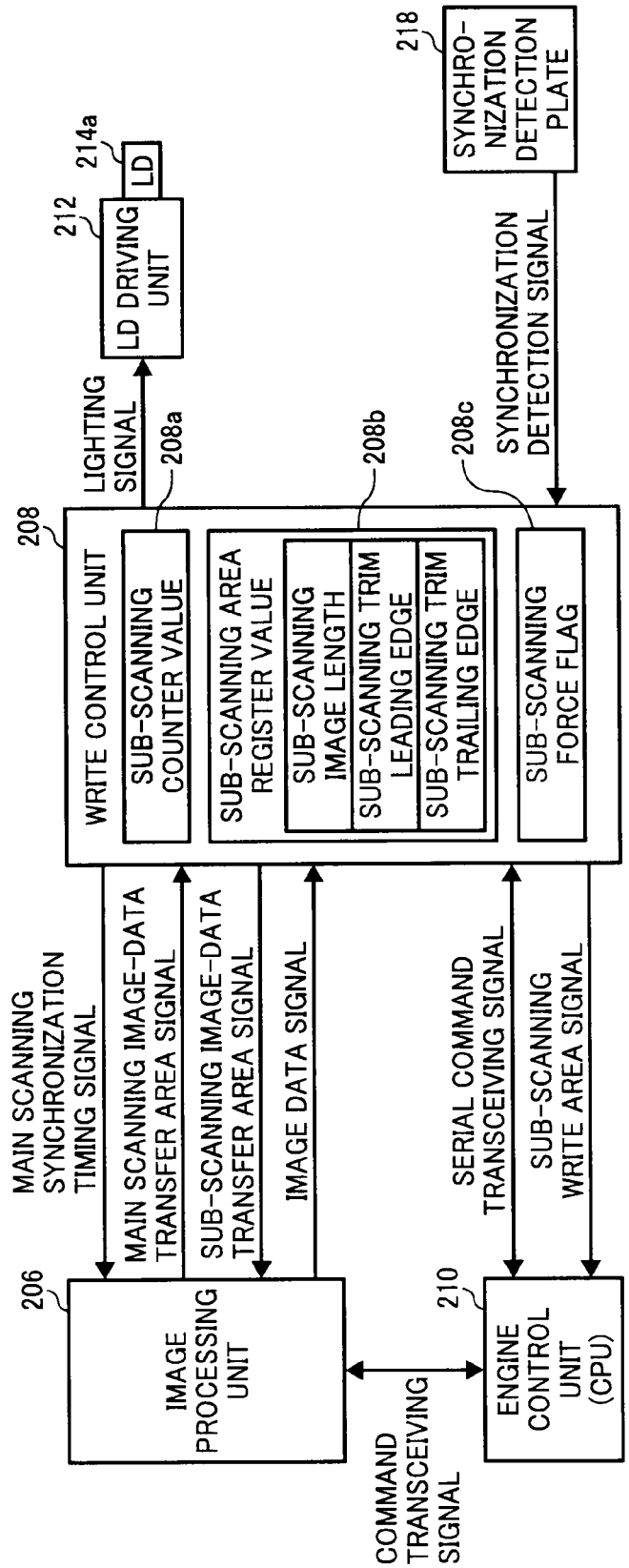
FIG. 4 is a block diagram of the write control unit shown in FIG. 3.

FIG. 4 is a block diagram of the write control unit 208. The write control unit 208 is configured as a microprocessor such as an ASIC. The write control unit 208 is configured to implement a function of controlling a timing in the sub-scanning direction. The timing in the sub-scanning direction is controlled using a sub-scanning counter, a sub-scanning area register, and a sub-scanning area force flag. The sub-scanning counter manages a write control timing in the sub-scanning direction. The sub-scanning counter starts counting up in synchronization with assertion of the sub-scanning image-data transfer area signal for requesting transfer of image data from the write control unit 208 to the image processing unit 206 by a start signal from a job start command. Specifically, the sub-scanning counter loads a default value form a ROM, an EEPROM, and an EPROM (not shown) used by the write control unit 208, and increments a counter value every time the synchronization detection signal is detected.

The write control unit 208 compares a sub-scanning area register value 208b with a sub-scanning counter value 208a. The sub-scanning area register value 208b contains data such as a sub-scanning image length, a sub-scanning trim leading edge, and a sub-scanning trim trailing edge for controlling a sub-scanning area. The write control unit 208 generates area signals such as the sub-scanning image-data transfer area signal, the sub-scanning write area signal, and the sub-scanning trim area signal based on above comparison. The sub-scanning trim area signal is a signal used within the write control unit 208 for setting image data within a trim area to be valid and masking the image data as image data to be sent to the LD driving unit 212. Thus, a final write area of the image data is set based on the sub-scanning trim area signal.

A sub-scanning force flag 208c is set to either assertion or negation. When the sub-scanning force flag 208c is asserted, the active state of the area signals in the sub-scanning direction for forming an image in the sub-scanning direction is continued regardless of the sub-scanning counter value and the sub-scanning area register value. On the other hand, when the sub-scanning force flag 208c is negated, the area signals in the sub-scanning direction are controlled based on the sub-scanning counter value 208a and the sub-scanning area register value 208b.

The sub-scanning force flag 208c is implemented as a switching module of the engine control unit 210 when the following conditions are satisfied. When the implemented sub-scanning force flag 208c is asserted to forcibly continue the image forming in the sub-scanning direction, it is possible to perform image forming on a recording medium in a non-standard size without largely changing settings of the write control unit 208. The switching module can perform switching of various controls such as a counter control, a counter and flag control, and a flag control by performing the following determination processing.

(a) When data indicative of the sub-scanning force flag setting is contained in a predetermine area of data bit of the main-scanning image-data transfer area signal sent from the image processing unit 206.

(b) When the write control unit 208 determines that a value larger than a set value stored in the ROM and corresponding to a valid area of an image specified by the main-scanning image-data transfer area signal.

(c) When a register value identifying the sub-scanning force flag setting and preset in the ROM is specified.

When one of (a) to (c) is satisfied, the image forming apparatus 100 sets the sub-scanning force flag 208c and performs the image forming on the recording medium in the nonstandard size. On the other hand, when (a) to (c) are not satisfied, the sub-scanning control is performed using the sub-scanning counter value and the register set value.

Figure 5:
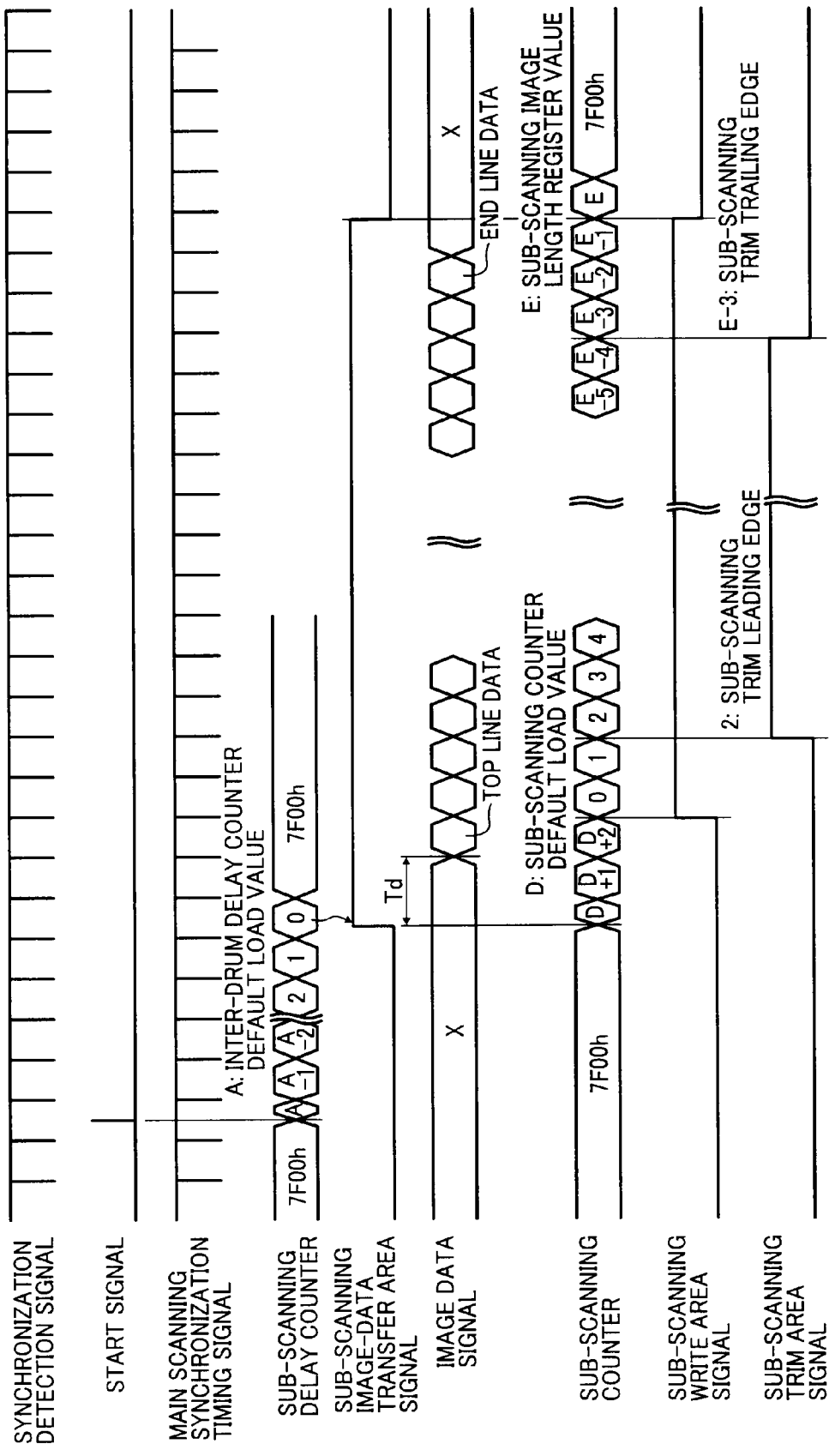
FIGS. 5 to 7 are timing charts of image area control performed by the write control unit shown in FIG. 3.

FIG. 5 is a timing chart of an example of an image area control performed by the write control unit 208. In the example shown in FIG. 5, the sub-scanning force flag is not set, and the sub-scanning control using the sub-scanning counter value and the register set value is performed. As shown in FIG. 5, when a start signal based on a job start command is input to the write control unit 208, the write control unit 208 loads a delay counter default load value "A" to a sub-scanning delay counter, and decrements the delay counter default load value "A" in response to the synchronization detection signal. The sub-scanning delay counter is such that adjusts the registration amount in the sub-scanning direction, and changes the delay counter default load value "A" depending on a sub-scanning registration adjustment value. When the delay counter default load value "A" reaches zero due to decrement in the sub-scanning delay counter, the write control unit 208 asserts the sub-scanning image-data transfer area signal and loads a sub-scanning counter default load value "D" to the sub-scanning counter.

The sub-scanning counter is such that increments the sub-scanning counter default load value "D" in response to the synchronization detection signal. When the sub-scanning counter default load value "D" reaches a sub-scanning image length register value "E", the sub-scanning counter stops a counting operation, and resets the counter to a reset default value 0x7F00. The sub-scanning write area signal is asserted when a count value of the sub-scanning counter reaches zero, and negated when the count value of the sub-scanning counter reaches the sub-scanning image length register value "E". The sub-scanning trim area signal is asserted when the count value of the sub-scanning counter reaches a sub-scanning trim leading edge register value (set to "2" in the example shown in FIG. 5), and negated when the count value of the sub-scanning counter reaches a sub-scanning trim trailing edge register value ("E-3" in the example shown in FIG. 5). The sub-scanning write area signal and the sub-scanning trim area signal are set in units of line in the sub-scanning direction depending on the set value of the register. Alternatively, the sub-scanning write area signal and the sub-scanning trim area signal can be set in units of two lines, instead of in units of line, in the sub-scanning direction depending on the set value of the register.

In the example shown in FIG. 5, the sub-scanning trim area signal is negated in synchronization with a timing when the count value of the sub-scanning counter reaches the value E-3; and the sub-scanning write area signal is negated and the sub-scanning counter value is reset to the reset default value 0x7F00 in synchronization with a timing when the count value of the sub-scanning counter reaches the value E, resulting in termination of the sub-scanning control. In the same example, because the sub-scanning force flag setting conditions are not satisfied, a control using the sub-scanning counter and the register value is performed to execute the image forming on a recording medium in a standard size.

Figure 6:
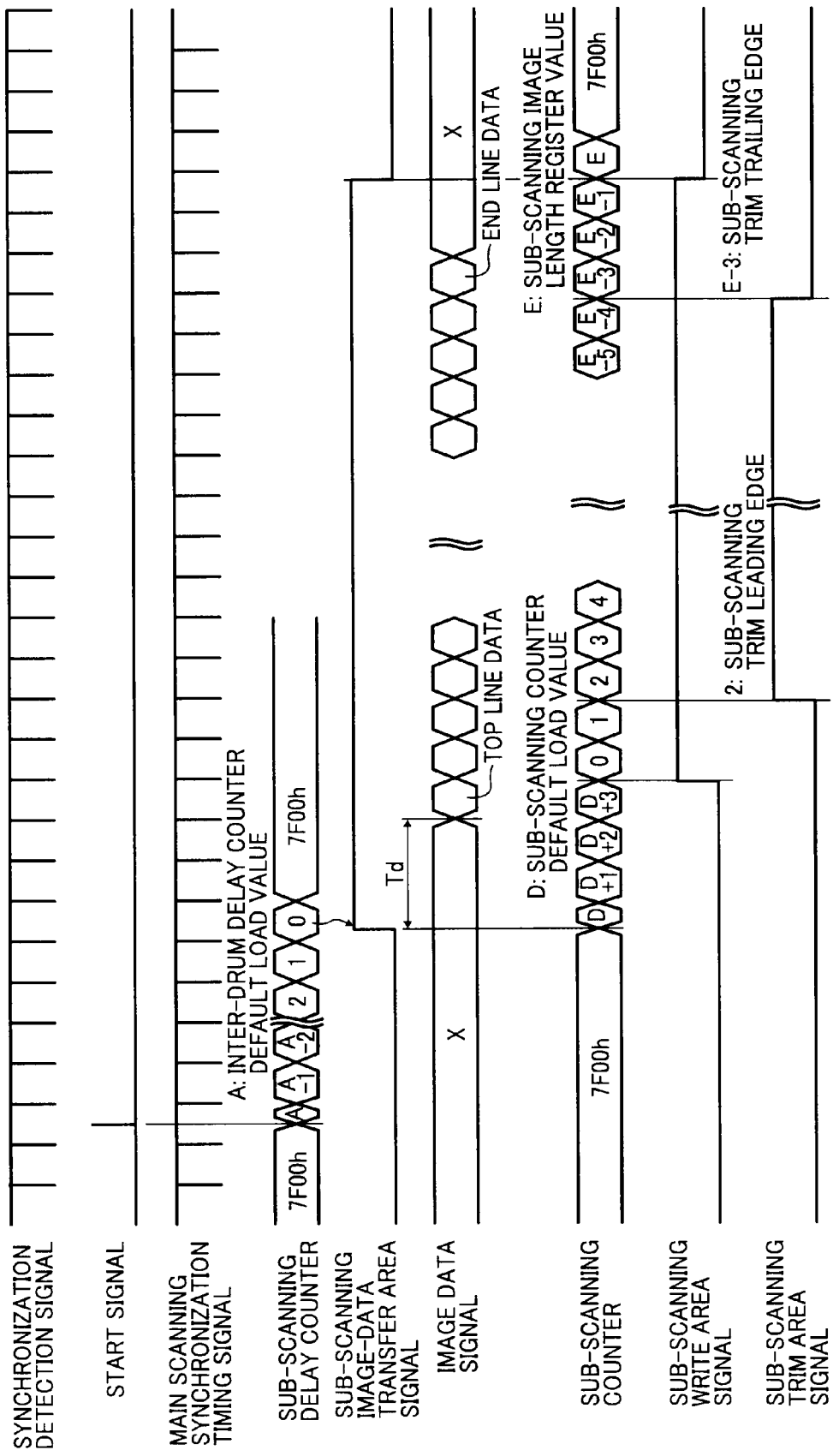

FIG. 6 is a timing chart of another example of the image area control performed by the write control unit 208. In the example shown in FIG. 6, the sub-scanning image-data transfer area signal is asserted in synchronization with a timing when the sub-scanning counter loads the default value D and negated in synchronization with a timing when the count value of the sub-scanning counter reaches the sub-scanning image length register value "E". The number of lines of the image data transferred from the image processing unit 206 corresponds to the number of sub-scanning write lines. Therefore, the image data needs to be negated in advance.

Figure 7:
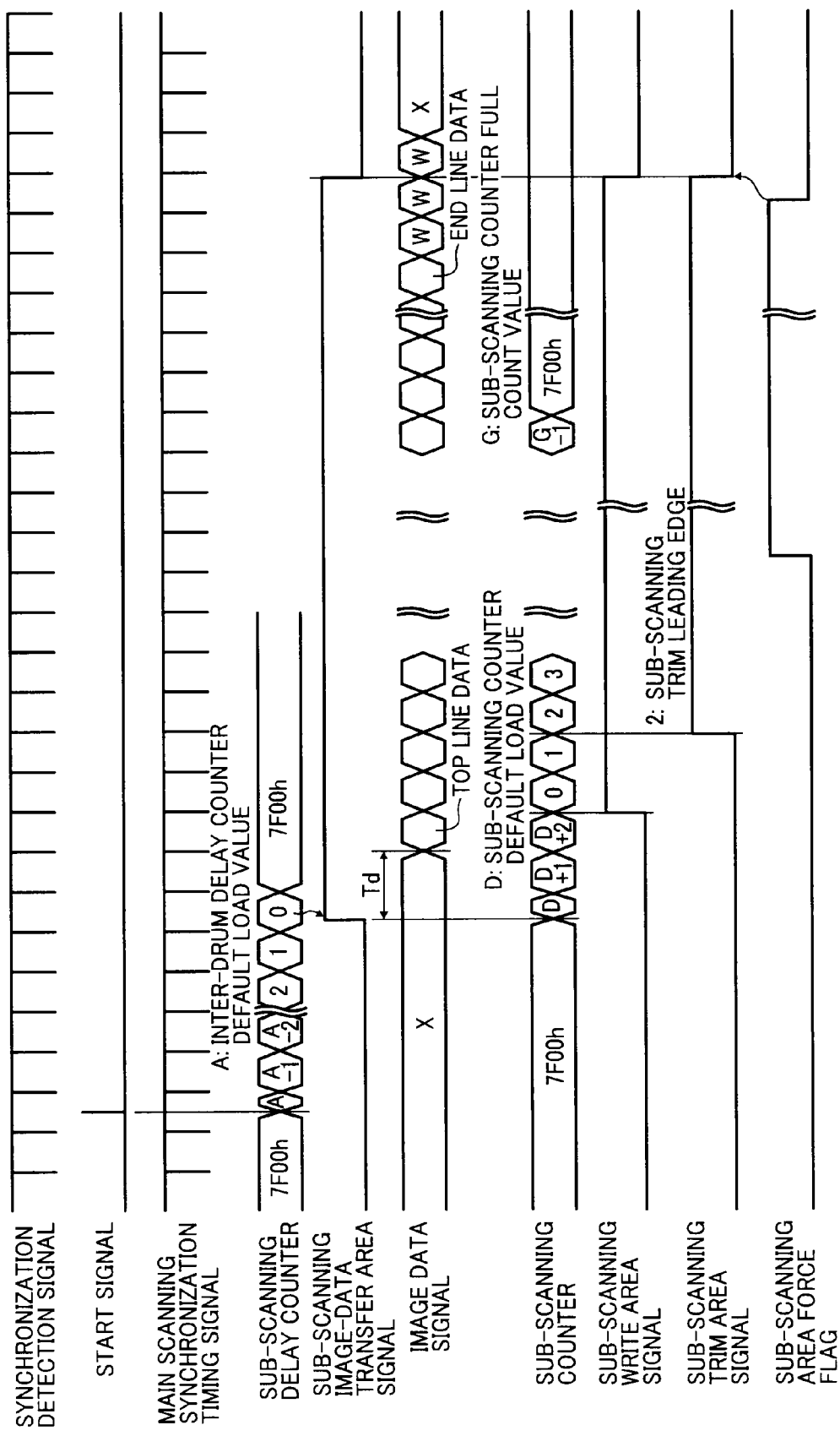

However, as shown in the example shown in FIG. 7, when the image processing unit 206 performs processing of adding white line data on a sub-scanning trailing portion and the write control unit 208 performs output masking processing for an excess white area using a sub-scanning trailing trim function, it is possible to control a timing of negating the sub-scanning image-data transfer area signal and a timing of negating the sub-scanning write area signal to be the same. Timings of assertion may be different for each signal depending on a mode of the image processing unit 206.

Specifically, an interval between the assertion of the sub-scanning image-data transfer area signal and the assertion of the sub-scanning write area signal is different from each other when the number of processing delay lines of the image processing unit 206 is different. In response to the assertion of the sub-scanning image-data transfer area signal, the image processing unit 206 outputs the image data signal to the write control unit 208. The number of the processing delay lines until top line data is output (Td) depends on an image processing mode executed by the image processing unit 206. That is, Td is not uniformly set. By changing the default load value of the sub-scanning counter depending on the change of the number of the processing delay lines associated with the processing mode, the difference in the number of the processing delay lines can be counterbalanced. For example, in the example shown in FIG. 5, Td is set as 2-line delay, while in the example shown in FIG. 6, Td is set as 3-line delay. Accordingly, the write control unit 208 sets 0x7FFD as the sub-scanning counter default load value in the example shown in FIG. 5, and sets 0x7FFC in the example shown in FIG. 6 in accordance with difference in the numbers of the processing delay lines of the image processing unit 206.

FIG. 7 is a timing chart of still another example of the image area control performed by the write control unit 208. In the example shown in FIG. 7, one of the conditions (a) to (c) is satisfied, and the sub-scanning force flag 208c is asserted (activated) at an appropriate timing before the sub-scanning counter reaches a full count. The appropriate timing is such that can be specifically distinguished from other control timings and independent from the other control timings when a clock time of a CPU is used. Examples of the other control timings include count up of the sub-scanning counter, assertion and negation of the sub-scanning write area signal, and assertion and negation of the sub-scanning trim area signal. The appropriate timing corresponds to a timing that is delayed for a predetermined time from various timings such as start of transferring the sub-scanning image-data transfer area signal and the image data signal, start of counting of the sub-scanning counter, assertion of the sub-scanning write area signal, and the assertion of the sub-scanning trim area signal.

In the example shown in FIG. 7, the sub-scanning delay counter is activated by the start signal and the sub-scanning image-data transfer area signal is asserted. The write control unit 208 activates the sub-scanning counter and asserts the sub-scanning write area signal and the sub-scanning trim area signal in response to receipt of the image data signal from the image processing unit 206 and thereby starts an image forming operation. The example shown in FIG. 7 is for performing the image forming in a long size, that is, the image forming in the sub-scanning direction is controlled with the sub-scanning image length longer than the full count value of the sub-scanning counter.

In a conventional sub-scanning control, even if the sub-scanning image length register is set the same value as the full count value of 0x7F00, when the sub-scanning counter reaches the full count value during an image forming operation, the sub-scanning counter stops at 0x7F00. Therefore, control in the sub-scanning direction over the full count is disabled. Thus, even when the maximum value (0x7F00) is set to the sub-scanning image length register of 15-bit widths, because a set value is the same as the sub-scanning counter value, the sub-scanning image-data transfer area signal, the sub-scanning write area signal, and the trim area signal are negated and thereby image forming is terminated. Thus, in the conventional sub-scanning control, every time the image forming is performed for the long size, the sub-scanning counter and the bit size of the register memory corresponding to the long size are necessary. As a result, necessary load for designing hardware and software increases, increasing necessary costs.

On the other hand, in the example shown in FIG. 7, whether the sub-scanning force flag 208c is set is determined using computer programs written in assembler language and C language. This determination is performed before the count value of the sub-scanning counter and the default load value D are compared with each other. The engine control unit 210 sends a job start command to the write control unit 208. After a predetermined time elapses from sending of the job start command, the engine control unit 210 monitors the sub-scanning image-data transfer area signal from the write control unit 208. When detecting that the area signal is activated, the engine control unit 210 acknowledges that the image forming operation is started.

Figure 8:
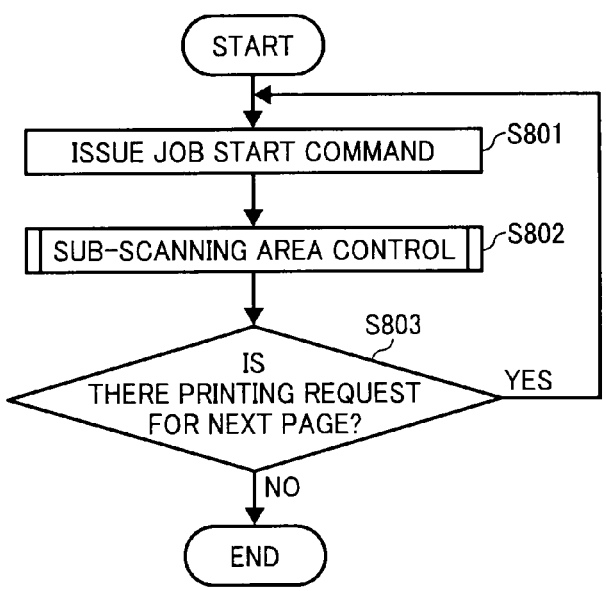
FIG. 8 is a flowchart of a sub-scanning control performed by the write control unit shown in FIG. 3.

FIG. 8 is a flowchart of the sub-scanning control shown in FIG. 7 and performed by the write control unit 208. When the engine control unit 210 issues the job start command to the write control unit 208 (Step S801), the write control unit 208 performs a sub-scanning area control process shown in FIG. 9 (Step S802).

Figure 9:
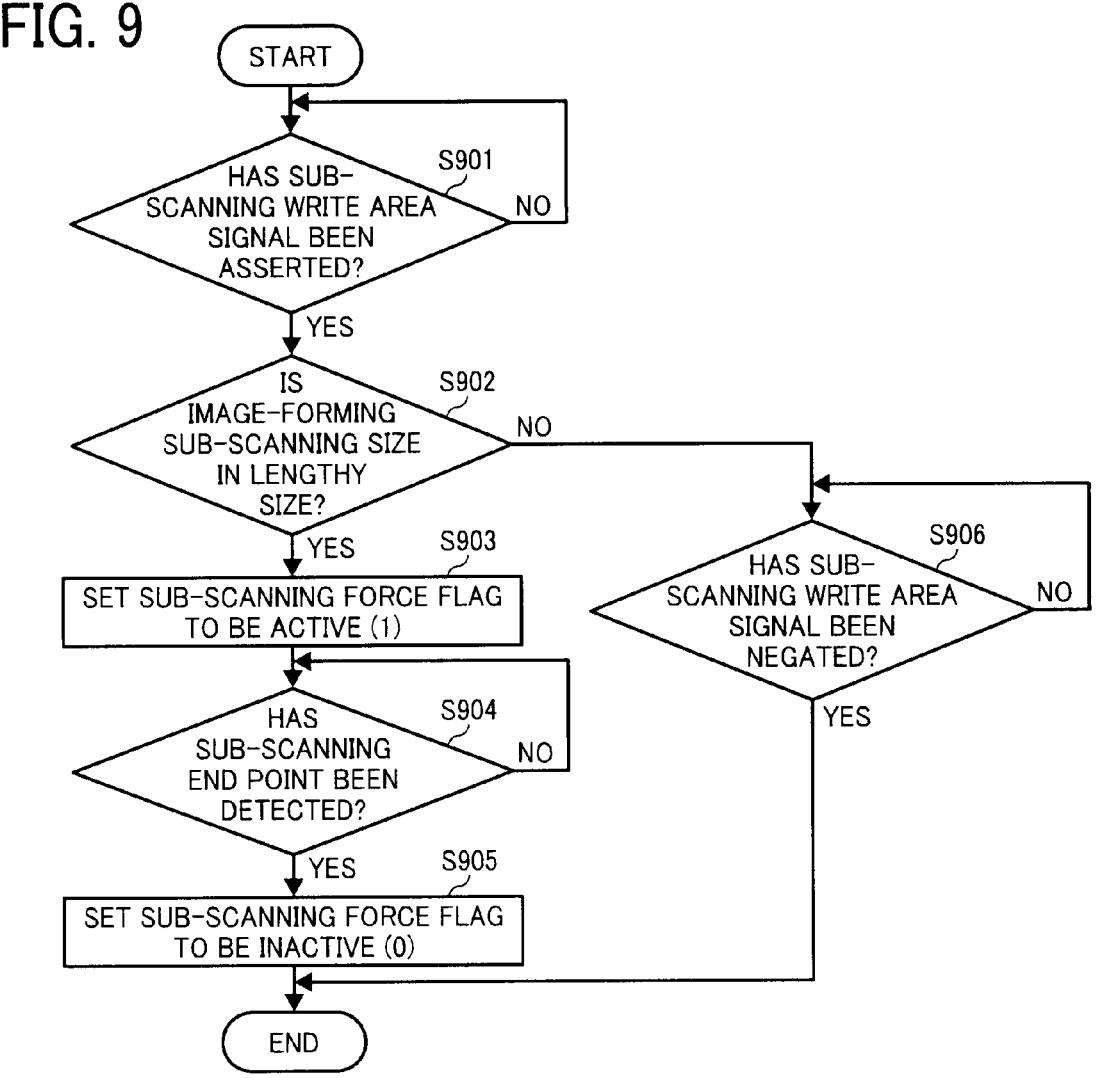
FIG. 9 is a flowchart of a sub-scanning area control process shown in FIG. 8.

FIG. 9 is a flowchart of the sub-scanning area control process at Step S802. The write control unit 208 determines whether the sub-scanning write area signal has been asserted (Step S901). When it is determined that the sub-scanning write area signal has not been asserted (No at Step S901), the write control unit 208 stands by until the sub-scanning write area signal is asserted. On the other hand, when it is determined that the sub-scanning write area signal has been asserted (Yes at Step S901), the write control unit 208 determines whether the sub-scanning size of the area of an image to be formed is in the long size (Step S902).

When it is determined that the sub-scanning size of the area of the image is not in the long size (No at Step S902), the write control unit 208 determines whether the sub-scanning write signal has been negated (Step S906). When it is determined that the sub-scanning write signal has not been negated (No at Step S906), the write control unit 208 stands by until the sub-scanning write signal is negated. On the other hand, when it is determined that the sub-scanning write signal has been negated (Yes at Step S906), process control ends.

When it is determined that the sub-scanning size of the area of the image is in the long size (Yes at Step S902), the write control unit 208 sets the sub-scanning force flag 208c to be active (Step S903), and determines whether the sub-scanning end point has been detected with the activated sub-scanning force flag 208c (Step S904). When it is determined that the sub-scanning end point has not been detected (No at Step S904), the write control unit 208 stands by until the sub-scanning end point is detected. On the other hand, when it is determined that the sub-scanning end point has been detected (Yes at Step S904), the write control unit 208 sets the sub-scanning force flag 208c to be inactive (Step S905), and process control ends.

Referring back to FIG. 8, when the sub-scanning area control process ends at step S802, the write control unit 208 determines whether there is a printing request for a next page, that is, whether there is an image data transfer request (Step S803). When it is determined that there is the printing request (Yes at Step S803), process control returns to Step S801, and processes from Step S802 are repeated. On the other hand, when it is determined that there is not the printing request (No at Step S803), process control ends.

In the example shown in FIG. 7, the setting of the sub-scanning force flag 208c is asserted after the sub-scanning image-data transfer area signal is asserted and the write control unit 208 is asserted after the delay time until the sub-scanning trim area is activated. When the sub-scanning force flag 208c is asserted, processing of determining whether the sub-scanning counter value 208a is larger than the sub-scanning area register value 208b and processing of negating the sub-scanning write area signal and the sub-scanning trim area signal are skipped, and negations of the sub-scanning write area signal and the sub-scanning trim area signal are controlled in synchronization with the negation (inactivation) of the sub-scanning force flag 208c. With the above control, the sub-scanning image-data transfer area signal is controlled depending on the assertion and the negation of the sub-scanning force flag 208c. Therefore, it is possible to continue the image forming after the sub-scanning counter value 208a reaches the full count.

A timing of terminating the image forming is determined by the negation of the sub-scanning force flag 208c. The negation of the sub-scanning force flag 208c can be performed using various methods other than that described above. For example, in the example shown in FIG. 5, an end position of the long size can be detected by a detecting unit available by an engine control unit 201. After a sufficient time for performing image forming until the end of the transfer sheet is run at a detected timing, the sub-scanning force flag 208c is set to invalid by the write control unit 208. Then, the area signals are negated at a timing of a next cycle of the synchronization detection signal after the sub-scanning force flag 208c is negated.

By negating the area signals at the timing of a next cycle of the synchronization detection signal instead of the timing of negating the sub-scanning force flag 208c, it is possible to prevent an occurrence of a defected image caused by switching the sub-scanning control during scanning in the main-scanning direction. If the engine control unit 210 can detect the end position of the long size in the sub-scanning direction using resolution in units of line, the engine control unit 210 detects the end position in units of line to control the sub-scanning force flag 208c. On the other hand, if it is difficult to detect the end position in units of line, it is possible to transfer the image data from the image processing unit 206 to the write control unit 208 by adding dummy data such as a white line to the image data in the end of the valid image data in the sub-scanning direction. Examples of the dummy data include data of a white image and a delimiter character of a white image. The delimiter character can be generated by the image processing unit 206 and sent as the image data.

The image forming apparatus 100 negates the sub-scanning force flag 208c at an appropriate timing during formation of an image of added dummy data or detection of the delimiter, so that image forming of the long size can be terminated without generating a defected image on a sub-scanning end portion of the output image. Thus, it is possible to form an image in the long size in the sub-scanning direction without changing hardware resources for ensuring bit widths of the sub-scanning counter and the area register corresponding to the sub-scanning long size. Furthermore, by setting a minimum cycle of the synchronization detection signal to be a timing of assertion and negation of the sub-scanning transfer-area signal in response to assertion and negation of the sub-scanning force flag 208c, it is possible to prevent a defected image from a leading edge in the main-scanning direction with minimum delay time.

As shown in FIGS. 5 to 7, for forming an image in the standard size, the image valid area in the sub-scanning direction is set within a range from the sub-scanning counter value of zero or larger to a set register value of the sub-scanning image length or smaller based on the sub-scanning counter value and the sub-scanning area register value. In this state, the counter value of zero is considered as the leading edge in the sub-scanning direction and the set register value of the sub-scanning image length is considered as the trailing edge in the sub-scanning direction. On the other hand, for forming an image in the long size, the counter value of zero is detected as the leading edge in the sub-scanning direction similar to the image in the standard size. However, the sub-scanning force flag 208c is changed from a negated state to an asserted state after the sub-scanning leading edge is detected, so that the sub-scanning area signal is remain in an active state even after the sub-scanning counter value is stopped at its full count. The counting of the sub-scanning counter can be terminated at the same timing of asserting the sub-scanning force flag 208c.

During assertion of the sub-scanning force flag 208c, the sub-scanning area signal is controlled to be in an active state and in an inactive state without using the sub-scanning counter and the sub-scanning area register value. The active state is continued while the sub-scanning force flag 208c is set and thereby the image forming is continued. For the sub-scanning trailing edge, the sub-scanning force flag 208c is changed from the asserted state to the negated state to change the sub-scanning image-data transfer area signal to be in the inactive state. Until the sub-scanning force flag 208c is asserted, the write control unit 208 controls the sub-scanning area signal based on a magnitude relation between the sub-scanning counter value and the sub-scanning area register value.

Thus, by continuously setting the sub-scanning force flag to be in the inactive state while forming an image in the standard size, it is possible to perform the image forming for both the standard size and the long size by the write control unit 208 with a single control block only by changing a minimum software structure in a conventional image forming method. As a result, scalability in size of an image to be formed by the image forming apparatus 100 can be enhanced.

Figure 10:
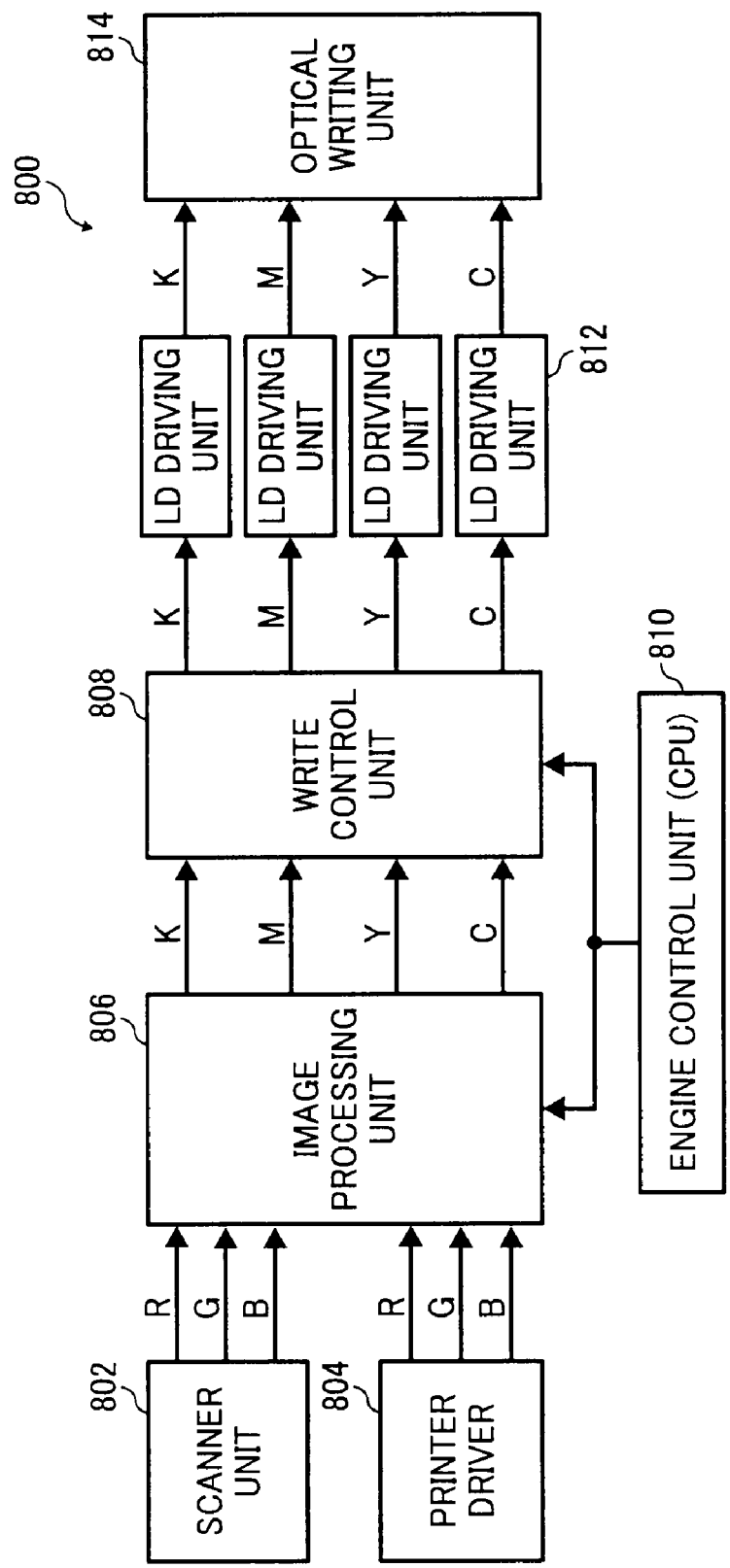
FIG. 10 is a block diagram of a control block that controls data flow of color image data in a color image forming apparatus according to a second embodiment of the present invention.

FIG. 10 is a block diagram of a control block 800 that controls data flow of image data in a color image forming apparatus according to a second embodiment of the present invention. In the control block 800, image data of RGB is input from a scanner unit 802 and a printer driver 804 for forming a color image. An image processing unit 806 executes processing such as conversion of a color gamut between RGB and KMYC, and a color conversion. Color-converted image data is sent to a write control unit 808, and output as four-color image data using four colors of black (K), magenta (M), yellow (Y) and cyan (C) corresponding to toner colors. The four-color image data is sent to LD driving units 812 for four colors. The LD driving units 812 drives laser diodes for corresponding colors to form an electrostatic latent image on photosensitive drums.

Figure 11:
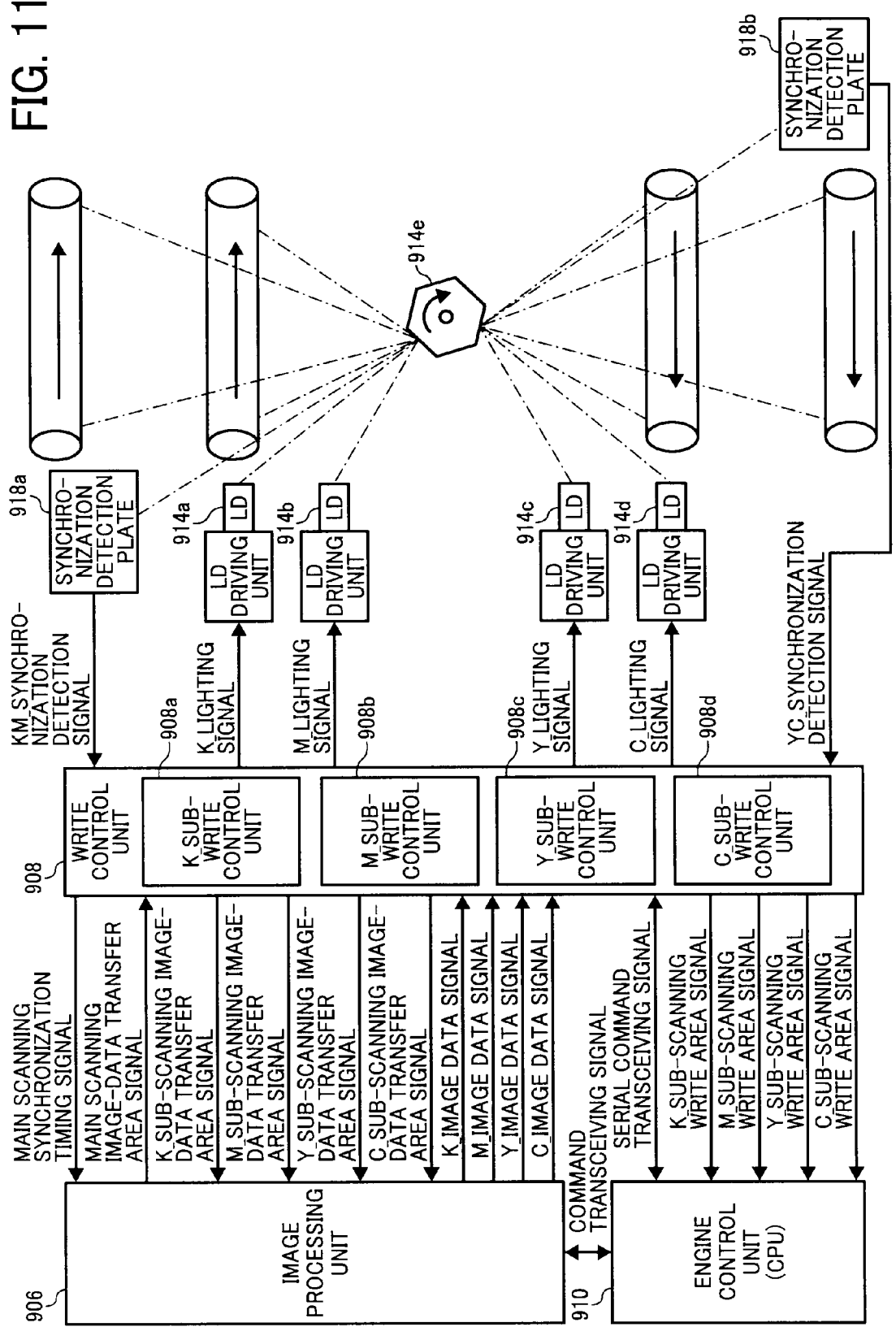
FIG. 11 is a block diagram of a control block according to a third embodiment of the present invention.

FIG. 11 is a schematic diagram of a control block 900 according to a third embodiment of the present invention. Detailed configurations of a write control unit 908 and a peripheral block that controls the write control unit 908 are shown in FIG. 11. The control block 900 includes functional blocks similar to those in the control block 200 shown in FIG. 3. Meanwhile, the control block 900 has functions for a color image forming apparatus, that is, control signals for four colors K, M, Y, and C are sent among an engine control unit 910, the write control unit 908, and an image processing unit 906. The write control unit 908 includes sub-write control units 908a to 908d for respective colors K, M, Y, and C. Each of the sub-write control units 908a to 908d independently loads image data in corresponding color and executes the main- and the sub-scanning timing controls.

Optical writing units 914a to 914d are arranged such that scanning is performed in directions opposite to each other across a motor 914e. The configuration of the optical units is not limited to that described above. It is possible to arrange a motor for each optical unit for each color. Synchronization detection plates 918a and 918b are arranged opposite to each other across the motor 914e. Specifically, the synchronization detection plate 918a is used for two colors on one side and the synchronization detection plate 918d is used for other two colors on the other side. That is, in the control block 900, the synchronization detection plate 918a is used for colors K and M, and the synchronization detection plate 918b is used for colors Y and C to perform synchronization control. The write control for each color is performed in the same manner as that described in connection with FIGS. 2 to 7.

Figure 12:
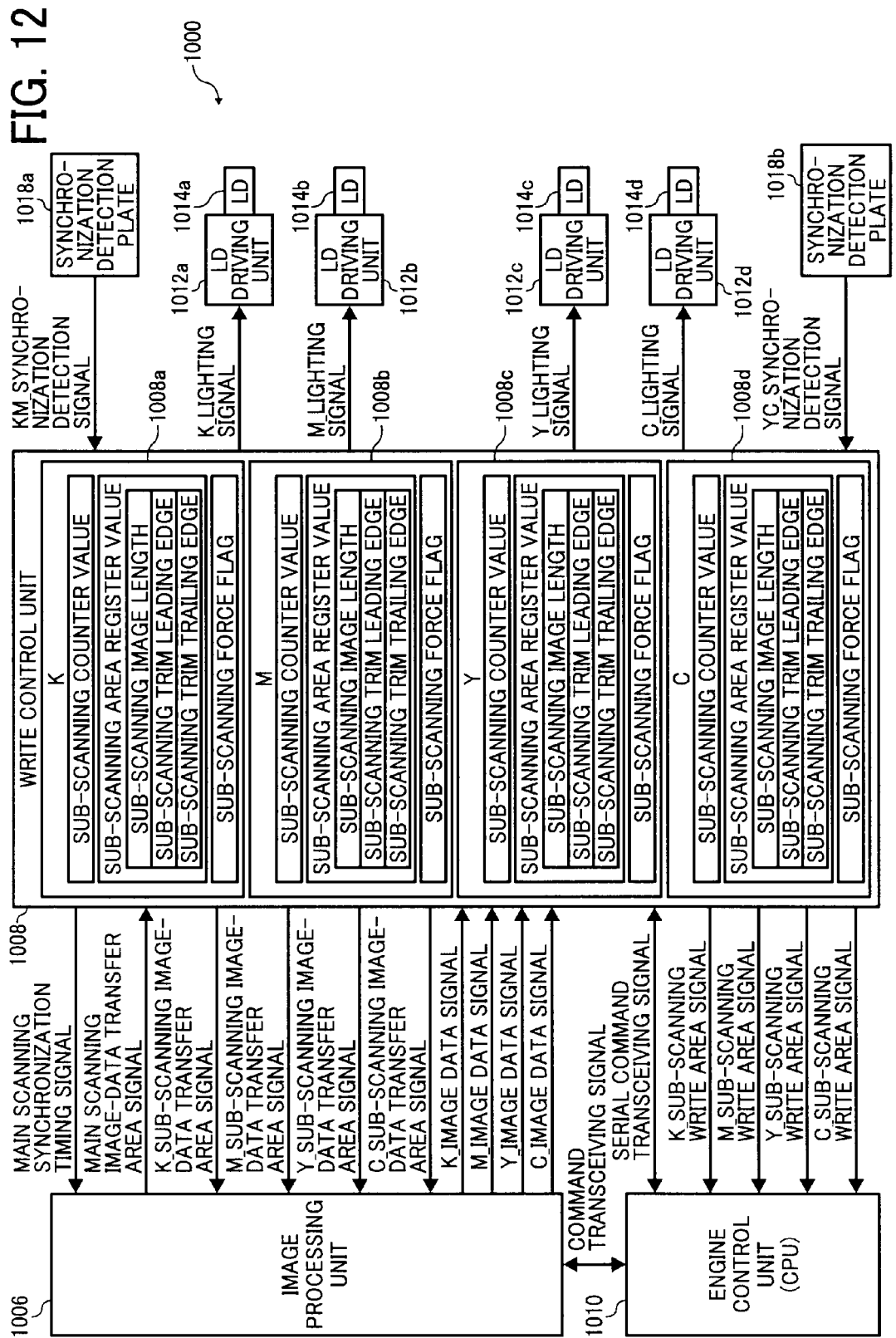
FIG. 12 is a block diagram for explaining a data structure of a write control unit and a sub-scanning timing control process performed by a control block according to the third embodiment.

FIG. 12 is a block diagram for explaining a data structure in a write control unit 1008 and a sub-scanning timing control performed by a control block 1000 according to the third embodiment. As for a timing of image forming in a color tandem type image forming apparatus that includes a plurality of photosensitive drums, it is necessary to form an image at a timing depending on a position of each of the photosensitive drums. That is, image forming timings in the sub-scanning direction are different with respect to each color even when image data on the same page is formed. Therefore, the write control unit 1008 that performs write controls for a plurality of colors performs a timing control in the sub-scanning direction for each color. Thus, sub scanning counter and a sub-scanning area register for setting an image area are arranged for each of colors K, M, Y, and C in the write control unit 1008.

The timings of forming an image in different colors in the sub-scanning direction are independent from one another even when an image in the long size is formed. Therefore, a sub-scanning force flag can be set independently for each color in each of sub-write control units 1008a to 1008d. In the example shown in FIG. 12, by performing the sub-scanning timing control using the sub-scanning force flag independently set for each color, image forming of the image in the long size can be easily performed in the color tandem type image forming apparatus. Thus, by using the write control unit 1008 having the above configuration, the image forming of the image in the long size can be performed only with minimum software adjustment.

Figure 13:
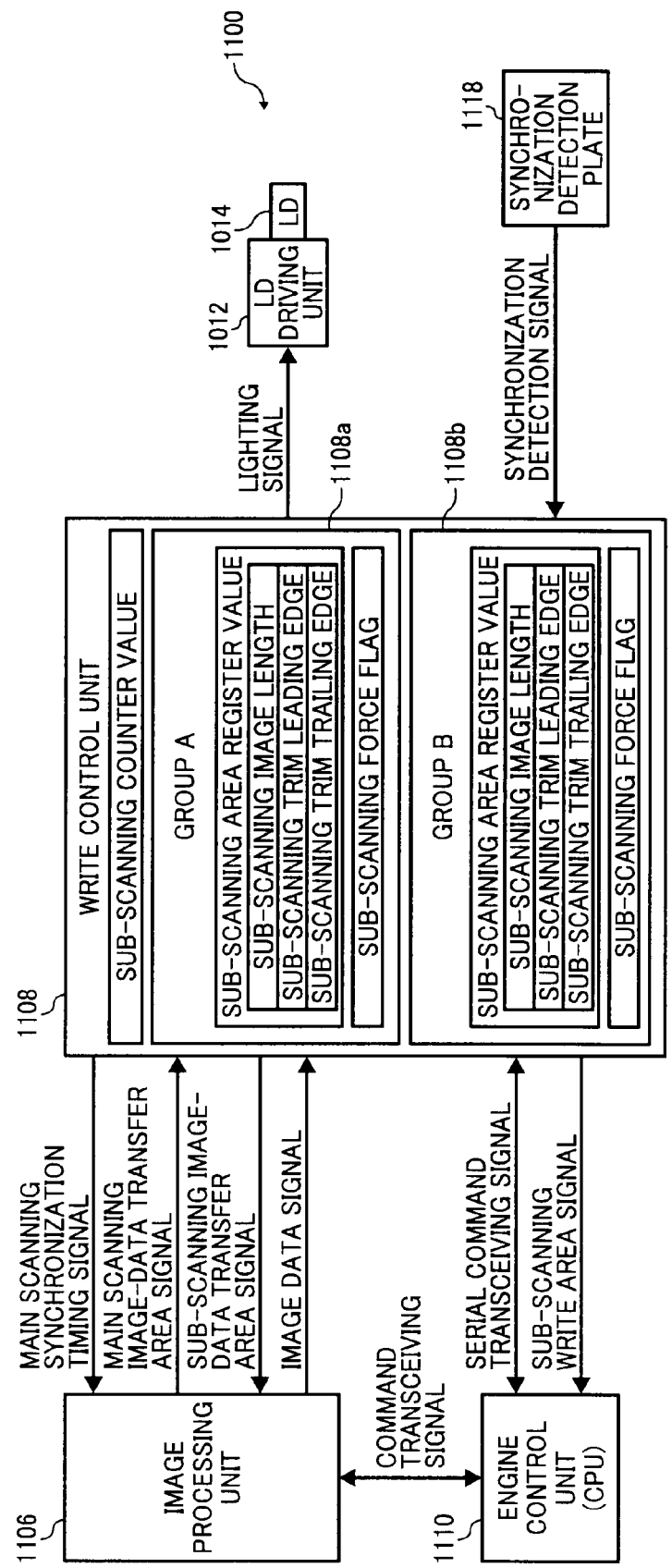
FIG. 13 is a block diagram of a write control unit according to a fourth embodiment of the present invention.

FIG. 13 is a schematic diagram of a control block 1100 having a write control unit 1108 according to a fourth embodiment of the present invention. The write control unit 1108 has a configuration for performing a timing control in the sub-scanning direction different from that of the write control unit 208 shown in FIG. 4. Specifically, the write control unit 1108 includes a sub-scanning counter and two sub-scanning area registers and two sub-scanning force flags in a group A 1108a and a group B 1108b. The sub-scanning area registers and the sub-scanning force flags are used for setting a sub-scanning image length, a sub-scanning trim leading edge, and a sub-scanning trim trailing edge, and controlled with respect to each group.

By arranging the group A and the group B as shown in FIG. 13, it is possible to perform image forming in a preferable manner even when different sizes are present in a single image forming process such as an interleaved process. For example, when a recording medium in A3 size and a recording medium in A4 size are present in one document in an image forming process, an image area needs to be changed promptly during the process. In this case, if the image area register is shared for different sizes, an image area register value needs to be changed by performing a serial command communication from an engine control unit 1110 at a time of changing the size. When performance capacity of the engine control unit 1110 is sufficient, a timing of image forming is not delayed at the time of changing the size. However, if the performance capacity of the engine control unit 1110 is not sufficient, a timing of image forming at the time of changing the size are delayed, and restarted after the image area register setting is changed. Therefore, image forming performance such as a print per minute (PPM) value degrades in the image forming apparatus.

The sub-scanning area registers of the group A 1108a and the group B 1108b are configured to perform a pseudo thread processing. Specifically, one of the registers of the group A 1108a and the group B 1108b is selected depending on a size of a recording medium, and a set value in the other register is changed when different size is selected. For example, a setting for A4 size is performed in the group A so that the register of the group A is selected for forming an image in A4 size. If information indicative of size change to A3 size is detected during the image forming of the image in A4 size, microprocessor causes the register of the group B to acquire a register value corresponding to A3 size. Accordingly, at a timing when a size of a target document is changed from A4 size to A3 size, an address setting of a data read register is changed from the group A to the group B.

Thus, it is possible to provide an image forming apparatus that can form an image without degrading image forming performance depending on the performance of the engine control unit 1110. For processing the recording medium in a nonstandard size such as a long size is performed in the similar manner as described above. That is, by arranging the sub-scanning force flag in each of the group A and the group B, it is possible to perform an image forming without degrading the image forming performance even when an image in the long size is formed. Thus, it is possible to send a notice indicative of the state to a user.

Figure 14:
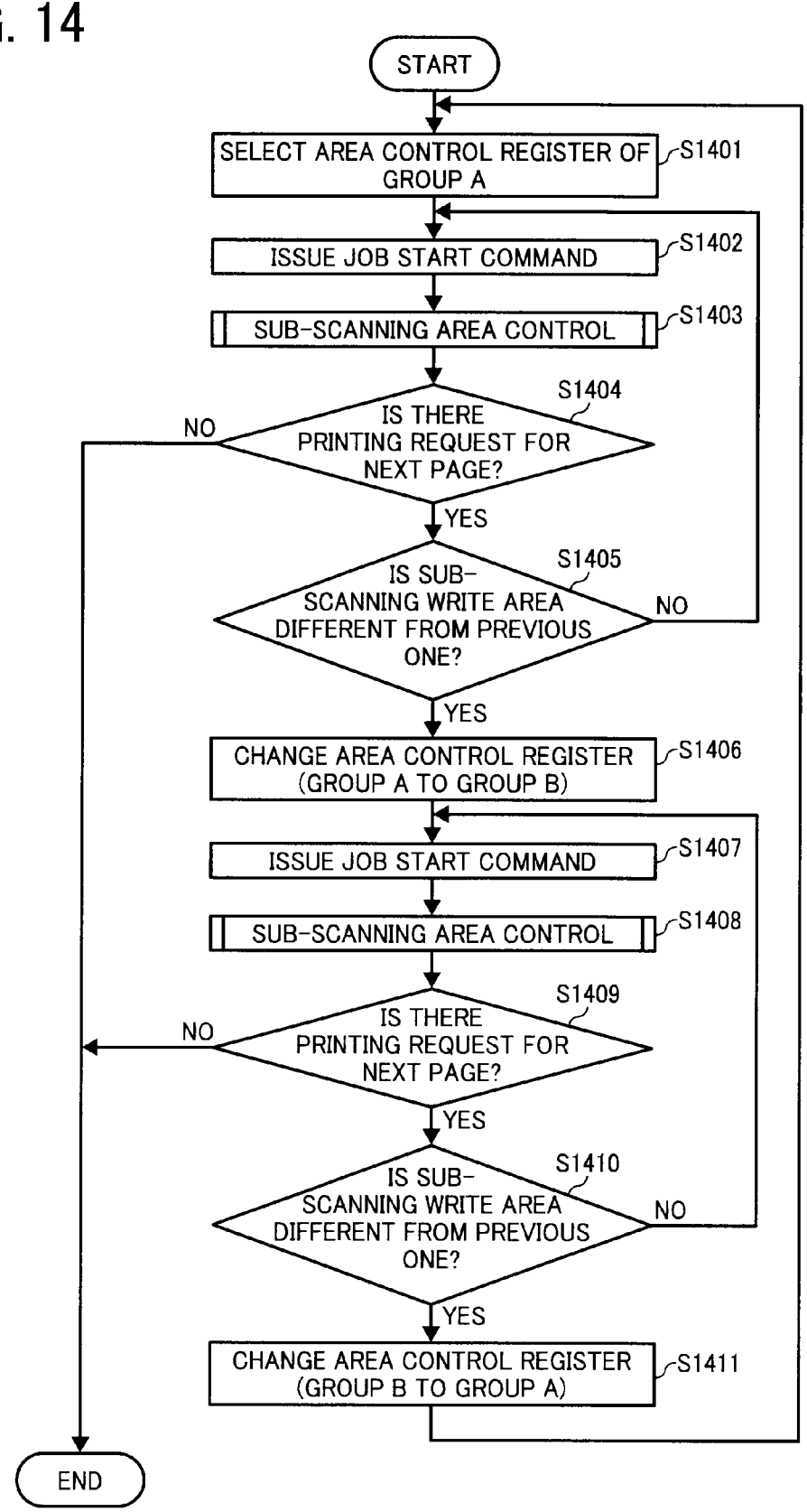
FIG. 14 is a flowchart of a sub-scanning control performed by the write control unit shown in FIG. 13.

FIG. 14 is a flowchart of a control of an image data area in the sub-scanning direction performed by the write control unit 1108. This process is performed for forming an image when sheets in different sizes are set in an image forming apparatus. Processes performed at Steps S1402 to S1404 and S1407 to S1409 are the same as those performed at Steps S801 to S803 described in connection with FIG. 8, and thus the same explanations are not repeated.

The write control unit 1108 detects a size of a sheet set in an image forming apparatus, and selects the area control register of the group A (Step S1401). The process control proceeds to Steps S1402 to S1404. Then, the write control unit 1108 determines whether an area to which a sub-scanning write signal is written is different from a previous area (Step S1405). When it is determined that the area to which the sub-scanning write signal is written is the same as the previous area (No at Step S1405), process control returns to Step S1402 and the same processes are repeated.

On the other hand, when it is determined that the area to which the sub-scanning write signal is written is different from the previous area (Yes at Step S1405), the write control unit 1108 changes the area control register of the group A to the area control register of the group B (Step S1406). The process control proceeds to Steps S1407 to S1409. Then, the write control unit 1108 determines whether an area to which a sub-scanning write signal is written is different from a previous area (Step S1410). When it is determined that the area to which the sub-scanning write signal is written is the same as the previous area (No at Step S1410), process control returns to Step S1407 and the same processes are repeated. On the other hand, when it is determined that the area to which the sub-scanning write signal is written is different from the previous area (Yes at Step S1410), the write control unit 1108 changes the area control register of the group B to the area control register of the group A (Step S1411). Then the process control returns to Step S1401 and the same processes are repeated.

The functions described above are realized by a computer program written in a machine language converted from an assembler language and C language that has been used in a programming executed by a microprocessor. The computer program can be distributed using a machine readable recording medium such as ROM, EEPROM, and EPROM.

The present invention is not limited to the above embodiments. Accordingly, various modifications can be made without departing from the spirit or scope of the general inventive concept as defined by the appended claims and their equivalents.

As described above, according to an aspect of the present invention, in a video signal processing circuit in a write control unit, bit widths of a sub-scanning counter and an area register used for generating a sub-scanning valid-area signal can be reduced. Thus, circuit configuration can be downsized. Specifically, the sub-scanning valid-area signal is generated such that the bit-widths correspond to a sub-scanning length of a standard size instead of bit-widths corresponding to a maximum size in the sub-scanning direction.

Furthermore, according to another aspect of the present invention, the bit-widths of the sub-scanning counter and the area register can be largely reduced while image forming of images in nonstandard sizes such as a long size can be handled in addition to images in standard sizes. Furthermore, the image forming of images in nonstandard sizes can be easily handled without largely changing hardware settings.

Moreover, according to still another aspect of the present invention, in internal circuit configurations of the write control unit, the sub-scanning valid-area signal can be controlled by setting flags in addition to by the sub-scanning counter. Thus, the bit-widths of the sub-scanning counter and the area register can be reduced and costs for the circuits can be suppressed.

Furthermore, according to still another aspect of the present invention, when the sub-scanning valid-area signal is controlled by switching controls of set flags and the sub-scanning counter, priority of the controls is set. Specifically, when an image in a long size in the sub-scanning direction is formed, image forming is started using the same control sequence as that used for an image in a standard size and only a timing of terminating the image forming is controlled by adjusting software. Thus, control of image forming of an image in a long size can be easily performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a forming unit that forms a latent image of input image data;
   a counter that counts number of times of forming the latent image in a sub-scanning direction, in which an upper limit of the number of times is set;
   a first control unit that controls the forming unit to form the latent image based on the upper limit;
   a determining unit that determines whether a latent image forming is performed by the forming unit exceeding the upper limit; and
   a second control unit that controls, when the determining unit determines that the latent image forming is performed exceeding the upper limit, the forming unit to continue to form the latent image,
   wherein the determining unit makes a determination based on a flag that indicates whether the latent image forming is performed exceeding the upper limit, and
   wherein when the flag is in an active state, the second control unit validates a sub-scanning image-data transfer valid area, a sub-scanning write valid area, and a sub-scanning write trim area independently of a control by the counter.

2. The image forming apparatus according to claim 1, wherein the second control unit controls, when recording media having different sizes are used, a plurality of flags corresponding to the sizes separately, and includes a plurality of write control units allocated for each of the sizes.

3. The image forming apparatus according to claim 1, wherein when the flag is set, the second control unit sends dummy data to a write control unit.

4. The image forming apparatus according to claim 1, wherein the sub-scanning image-data transfer valid area, the sub-scanning write valid area, and the sub-scanning write trim area are negated in a cycle of a synchronization detection signal for detecting a write start position in a main-scanning direction after the second control unit inactivates the flag.

5. The image forming apparatus according to claim 1, wherein when the flag is in an active state, the second control unit retains a sub-scanning image-data transfer valid area, a sub-scanning write valid area, and a sub-scanning write trim area independently of a value of the counter, a register value for setting a sub-scanning image length, and a register value for setting a sub-scanning trim area.

6. The image forming apparatus according to claim 1, wherein the counter counts a synchronization detection signal for detecting a write start position in a main-scanning direction.

7. The image forming apparatus according to claim 1, further comprising an image processing unit that transfers the image data, wherein
   the counter starts a counting operation by loading a default value in synchronization with an issuance of a request for transferring the image data to the image processing unit from a write control unit.

8. The image forming apparatus according to claim 7, wherein the counter is capable of changing the default value.

9. The image forming apparatus according to claim 1, wherein the second control unit includes a register that stores therein a sub-scanning image length, and controls the sub-scanning image-data transfer valid area for controlling transfer of the image data by comparing a value of the counter with a value of the sub-scanning image length.

10. The image forming apparatus according to claim 1, wherein the second control unit stores therein a sub-scanning trim area for determining a valid area for forming an image in the sub-scanning direction, and controls the sub-scanning write trim area for driving a laser diode by comparing a value of the counter with a register value containing a sub-scanning trim area.

11. The image forming apparatus according to claim 1, further comprising a terminating unit that terminates a counting operation of the counter when a value of the counter matches a sub-scanning image length register value.

12. The image forming apparatus according to claim 1, further comprising a terminating unit that terminates a counting operation of the counter when a value of the counter reaches a full-counted value.

13. The image forming apparatus according to claim 1, further comprising a plurality of write control units for forming a color image, wherein
the flag is set with respect to each of colors to be used for forming the color image.

14. An image forming method for an image forming apparatus including a counter that counts number of times of forming a latent image of input image data in a sub-scanning direction in which an upper limit of the number of times is set, the image forming method comprising:
forming a latent image of input image data;
first controlling including controlling the forming to form the latent image based on the upper limit;
determining whether a latent image forming is performed exceeding the upper limit; and
second controlling including controlling, when it is determined that the latent image forming is performed exceeding the upper limit, the forming to continue to form the latent image,
wherein the second controlling further includes
making a determination based on a flag that indicates whether the latent image forming is performed exceeding the upper limit, and
validating, when the flag is in an active state, a sub-scanning image-data transfer valid area, a sub-scanning write valid area, and a sub-scanning write trim area independently of a control by the counter.

15. The image forming method according to claim 14, wherein the counter counts a synchronization detection signal for detecting a write start position in a main-scanning direction.

16. The image forming method according to claim 14, wherein the counter starts a counting operation by loading a default value in synchronization with an issuance of a request for transferring the image data to an image processing unit from a write control unit.

17. A non-transitory computer program product comprising a computer usable medium having computer readable program codes embodied in the medium for forming an image in an image forming apparatus including a counter that counts number of times of forming a latent image of input image data in a sub-scanning direction in which an upper limit of the number of times is set, the computer readable program codes when executed causing a computer to execute:
forming a latent image of input image data;
first controlling including controlling the forming to form the latent image based on the upper limit;
determining whether a latent image forming is performed exceeding the upper limit; and
second controlling including controlling, when it is determined that the latent image forming is performed exceeding the upper limit, the forming to continue to form the latent image,
wherein the second controlling further includes
making a determination based on a flag that indicates whether the latent image forming is performed exceeding the upper limit, and
validating, when the flag is in an active state, a sub-scanning image-data transfer valid area, a sub-scanning write valid area, and a sub-scanning write trim area independently of a control by the counter.

* * * * *